(12) United States Patent
Yang et al.

(10) Patent No.: US 11,182,563 B2
(45) Date of Patent: Nov. 23, 2021

(54) APPARATUS AND METHOD FOR GENERATING A DIALOGUE STATE TRACKING MODEL

(71) Applicant: Institute For Information Industry, Taipei (TW)

(72) Inventors: Wei-Jen Yang, Taipei (TW); Guann-Long Chiou, Taipei (TW); Yu-Shian Chiu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 253 days.

(21) Appl. No.: 16/691,547

(22) Filed: Nov. 21, 2019

(65) Prior Publication Data

US 2021/0109996 A1   Apr. 15, 2021

(30) Foreign Application Priority Data

Oct. 15, 2019   (TW) .................................. 108137091

(51) Int. Cl.
*G06F 40/30* (2020.01)
*G06F 16/332* (2019.01)
(Continued)

(52) U.S. Cl.
CPC .......... *G06F 40/30* (2020.01); *G06F 16/3329* (2019.01); *G06F 16/3344* (2019.01); *G06N 3/0454* (2013.01); *G06N 3/08* (2013.01)

(58) Field of Classification Search
CPC .. G06F 40/30; G06F 16/3329; G06F 16/3344; G06N 3/08
See application file for complete search history.

(56) References Cited

U.S. PATENT DOCUMENTS

2006/0271364 A1* 11/2006 Mirkovic ................ G06F 40/40
                                                                                 704/239
2007/0078815 A1*  4/2007 Weng ................ G06F 16/90332
(Continued)

FOREIGN PATENT DOCUMENTS

TW           201923569 A      6/2019
TW           I666558 B        7/2019

OTHER PUBLICATIONS

Office Action to the corresponding Taiwan Patent Application rendered by the Taiwan Intellectual Property Office (TIPO) dated May 29, 2020, 7pages (including English translation).

*Primary Examiner* — Kevin Ky
(74) *Attorney, Agent, or Firm* — Li & Cai Intellectual Property Office

(57) ABSTRACT

An apparatus and method for generating a dialogue state tracking model. The apparatus retrieves a field feature corresponding to a queried field from a database according to the queried field corresponding to a queried message. The apparatus retrieves a candidate-term feature corresponding to each of at least one candidate-term corresponding to the queried field from the database, and integrates them into an integrated feature. The apparatus also generates at least one relation sub-sentence of a reply message corresponding to the queried message and generates a sentence relation feature according to the at least one relation sub-sentence. The apparatus further generates a queried field related feature according to the field feature, the integrated feature and the sentence relation feature and trains the dialogue state tracking model according to the queried field related feature.

20 Claims, 10 Drawing Sheets

(51) Int. Cl.
*G06N 3/08* (2006.01)
*G06N 3/04* (2006.01)
*G06F 16/33* (2019.01)

(56) References Cited

U.S. PATENT DOCUMENTS

| | | | |
|---|---|---|---|
| 2017/0160813 A1* | 6/2017 | Divakaran | G06K 9/00335 |
| 2018/0054523 A1* | 2/2018 | Zhang | G06N 5/04 |
| 2018/0060301 A1* | 3/2018 | Li | G06N 3/08 |
| 2019/0138330 A1 | 5/2019 | Wu | |
| 2020/0042642 A1* | 2/2020 | Bakis | G06F 16/243 |
| 2020/0042649 A1* | 2/2020 | Bakis | G06F 40/14 |
| 2020/0160851 A1 | 5/2020 | Chiu et al. | |

* cited by examiner

APPARATUS AND METHOD FOR GENERATING A DIALOGUE STATE TRACKING MODEL

PRIORITY

This application claims priority to Taiwan Patent Application No. 108137091 filed on Oct. 15, 2019, which is hereby incorporated by reference in its entirety.

FIELD

The present invention relates to an apparatus and method for generating a dialogue state tracking model. In particular, the present invention relates to an apparatus and method for generating a dialogue state tracking model based on dialogue records.

BACKGROUND

Nowadays many enterprises have launched Artificial Intelligence (AI)-based dialogue services, e.g., using dialogue robots to provide customer services. This kind of dialogue services involves technologies in three aspects, including natural language understanding, dialogue management, and natural language generation. Dialogue state tracking in the dialogue management technology is used to interpret the key information in a dialogue and, hence, dialogue state tracking is an important factor regarding whether a dialogue service can correctly achieve a task (e.g., assisting users in handling traffic accident claims, and assisting users in buying tickets).

Some conventional dialogue management technologies are rule-based. Generally speaking, this kind of technologies performs semantic analysis to the sentences inputted/spoken by a user and then replies to the user with a predetermined rule based on the result of semantic analysis. This kind of technologies relies highly on the accuracy of semantic analysis. The reply generated based on the predetermined rule will be inaccurate if the meaning of the sentence inputted/spoken by the user cannot be accurately understood. In addition, this kind of technologies lacks flexibility because it is limited by the predetermined rules. Due to having the above drawbacks, this kind of technologies will lead to continuous errors and cannot complete a task when there is a misjudgment during the conversation.

Presently, some learning-based dialogue management technologies have been developed. This kind of technologies train neural network models by using features and then adopts the trained neural network models as dialogue state tracking models. However, whether this kind of technologies can accurately track dialogue state and then complete the task depends on the features that are used in training the neural network models and the way that the neural network models are trained with these features. Although learning-based dialogue management technologies are superior to rule-based dialogue management technologies, there is still a considerable room for improvement as compared to providing services directly by human beings.

Accordingly, for the learning-based dialogue management technologies, how to provide appropriate features (e.g. features containing semantics and various sentence relations) to train a neural network model as a dialogue state tracking model and how to train the model by using these features are urgent needs existing in the art.

SUMMARY

Provided is an apparatus for generating a dialogue state tracking model. The apparatus may comprise a storage and a processor, wherein the processor is electrically connected to the storage. The storage stores a database. The processor retrieves a field feature corresponding to a queried field from the database according to the queried field corresponding to a queried message, retrieves a candidate-term feature for each of at least one candidate-term corresponding to the queried field from the database, and integrates the at least one candidate-term feature into an integrated feature. The processor further generates at least one relation sub-sentence of a reply message corresponding to the queried message, generates a sentence relation feature according to the at least one relation sub-sentence, and generates a queried field related feature according to the field feature, the integrated feature, and the sentence relation feature. The processor further trains the dialogue state tracking model according to the queried field related feature.

Also provided is a method for generating a dialogue state tracking model, and the method is adapted for use in an electronic apparatus. The electronic apparatus stores a database. The method may comprise the following steps: (a) retrieving a field feature corresponding to a queried field from the database according to the queried field corresponding to a queried message, (b) retrieving a candidate-term feature for each of at least one candidate-term corresponding to the queried field from the database, (c) integrating the at least one candidate-term feature into an integrated feature, (d) generating at least one relation sub-sentence of a reply message corresponding to the queried message, (e) generating a sentence relation feature according to the at least one relation sub-sentence, (f) generating a queried field related feature according to the field feature, the integrated feature, and the sentence relation feature, and (g) training the dialogue state tracking model according to the queried field related feature.

The technology (at least including the apparatus and method) for generating a dialogue state tracking model retrieves different features (including the field feature corresponding to the queried field itself and the candidate-term feature(s) corresponding to the candidate-term(s)) from the database according to the queried field corresponding to a queried message in a round of dialogue. In addition, the technology finds out the relation sub-sentences of a reply message in the round of dialogue and generates a sentence relation feature accordingly. The technology further generates a queried field related feature for training a dialogue state tracking model according to the feature retrieved from the database and the sentence relation feature. Then, the technology trains the dialogue state tracking model with the queried field related feature.

In some embodiments, the technology may also utilize the reply message to retrieve other features from the database, and these other features are related to relation information and semantic information. The technology may also use these other features to generate other features (e.g., an advanced relation feature and a semantic feature) for training the dialogue state tracking model, and then use the queried field related feature along with the advanced relation feature and/or the semantic feature to train the dialogue state tracking model.

When generating various features used for training the dialogue state tracking model, the various aspects are taken into consideration, including various features related to the queried message and the reply message into consideration, various relation sub-substances and semantics of the reply message, and the mutual influences among the features, the relation sub-sentences, and the semantics into consideration. Thus, the dialogue state tracking model trained by the features generated by the technology can greatly improve the accuracy of dialogue state tracking and thereby increase the probability of accomplishing tasks.

The detailed technology and preferred embodiments implemented for the subject invention are described in the following paragraphs accompanying the appended drawings for people skilled in this field to well appreciate the features of the claimed invention.

DETAILED DESCRIPTION

In the following description, an apparatus and method for generating a dialogue state tracking model will be explained with reference to certain example embodiments thereof. However, these example embodiments are not intended to limit the present invention to any specific environment, example, embodiment, applications, or implementations described in these example embodiments. Therefore, description of these example embodiments is only for the purpose of explanation rather than to limit the scope of the present invention.

It should be appreciated that in the following embodiments and the attached drawings, elements unrelated to the present invention are omitted from depiction. Furthermore, dimensions of elements and dimensional scales among individual elements in the attached drawings are provided only for ease of depiction and illustration, but not to limit the scope of the present invention.

Figure 1A:
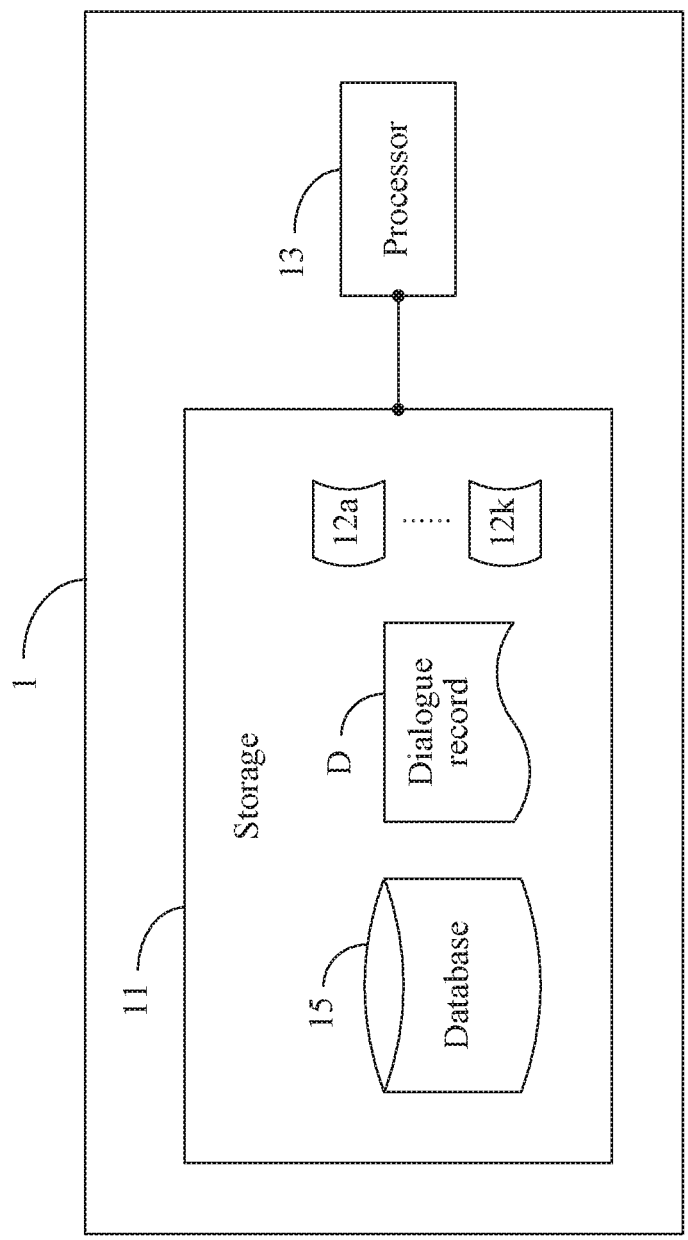
FIG. 1A is a schematic view of a model generation apparatus of a first embodiment.

A first embodiment of the present invention is an apparatus 1 for generating a dialogue state tracking model 10 (hereinafter referred to as "model generation apparatus"), whose schematic view is depicted in FIG. 1A. The model generation apparatus 1 comprises a storage 11 and a processor 13, which are electrically connected with each other. The storage 11 may be a Hard Disk Drive (HDD), a Universal Serial Bus (USB), a Compact Disk (CD), or any other non-transitory storage medium or apparatus with the same function and well-known to those of ordinary skill in the art. The processor 13 may be one of various processors, Central Processing Units (CPUs), Microprocessor Units (MPUs), Digital Signal Processors (DSPs), or any other computing apparatus with the same function and well-known to those of ordinary skill in the art.

In this embodiment, the storage 11 of the model generation apparatus 1 stores a database 15, and the database 15 comprises a plurality of words commonly used in dialogues of a certain task (e.g., insurance claims, a ticketing system, without being limited thereto), a feature of each word, and correspondence relationships between the words (e.g., which words are related to each other). The feature of each word may be a feature vector. For example, the features may be a plurality of word vectors obtained by converting the words into a vector space through a word to vector algorithm.

Figure 1B:
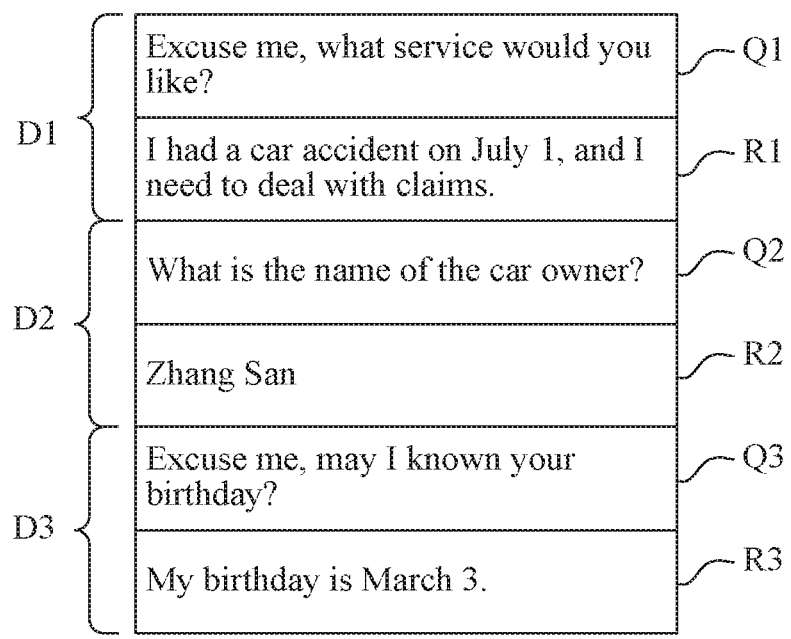
FIG. 1B is a specific example of a dialogue record.

In this embodiment, the storage 11 also stores a dialogue record D regarding a conversation between a human-machine dialogue system (e.g., a dialogue robot) and a user. The dialogue record D comprises at least one round of dialogue, wherein each round of dialogue comprises a queried message and a reply message, and the queried message and the reply message in the same round of dialogue correspond to each other. The queried message in one round of dialogue is the question raised by the human-machine dialogue system, and the reply message in one round of dialogue is the user's reply to the queried message. For comprehension, please refer to a specific example shown in FIG. 1B, but this specific example is not intended to limit the scope of the present invention. In this specific example, a dialogue record comprises three rounds of dialogues D1, D2, and D3, wherein the dialogue D1 comprises a queried message Q1 and a corresponding reply message R1, the dialogue D2 comprises a queried message Q2 and a corresponding reply message R2, and the dialogue D3 comprises a queried message Q3 and a corresponding reply message R3.

It is noted that in some embodiments, it is possible that the dialogue record D is not stored in the storage 11. Instead, the dialogue record D may be received by a receiving interface (e.g., a USB interface, a network interface, without being limited thereto) comprised in the model generation apparatus 1. For those embodiments, the receiving interface is electrically connected with the processor 13.

In this embodiment, the processor 13 of the model generation apparatus 1 generates a queried field related feature tf1 for training a dialogue state tracking model 10 according to a queried message Qm and a reply message Rm of a certain round of dialogue in the dialogue record D and uses the queried field related feature tf1 to train the dialogue state tracking model 10.

The queried message Qm is a question raised by the human-machine dialogue system and, hence, the queried message Qm corresponds to a queried field (not shown) by default. The queried field corresponding to the queried message Qm represents the information that the human-machine dialogue system expects from the user. For example, if the content of the queried message Qm is "May I know your birthday?", the queried field corresponding to the queried message Qm may be "birthday". It means that the human-machine dialogue system would like to know the user's birthday. Some queried messages Qm correspond to a queried field and a field reply (not shown) by default. The queried field and the field reply corresponding to the queried message Qm represent that the human-machine dialogue system expects the user to confirm the correctness of a certain piece of information. For example, if the content of the queried message Qm is "Is your birthday March 3?", the queried field and the field reply corresponding to the queried message Qm may be respectively "birthday" and "March 3". It means that the human-machine dialogue system would like the user to confirm whether his/her birthday is March 3.

Figure 1C:
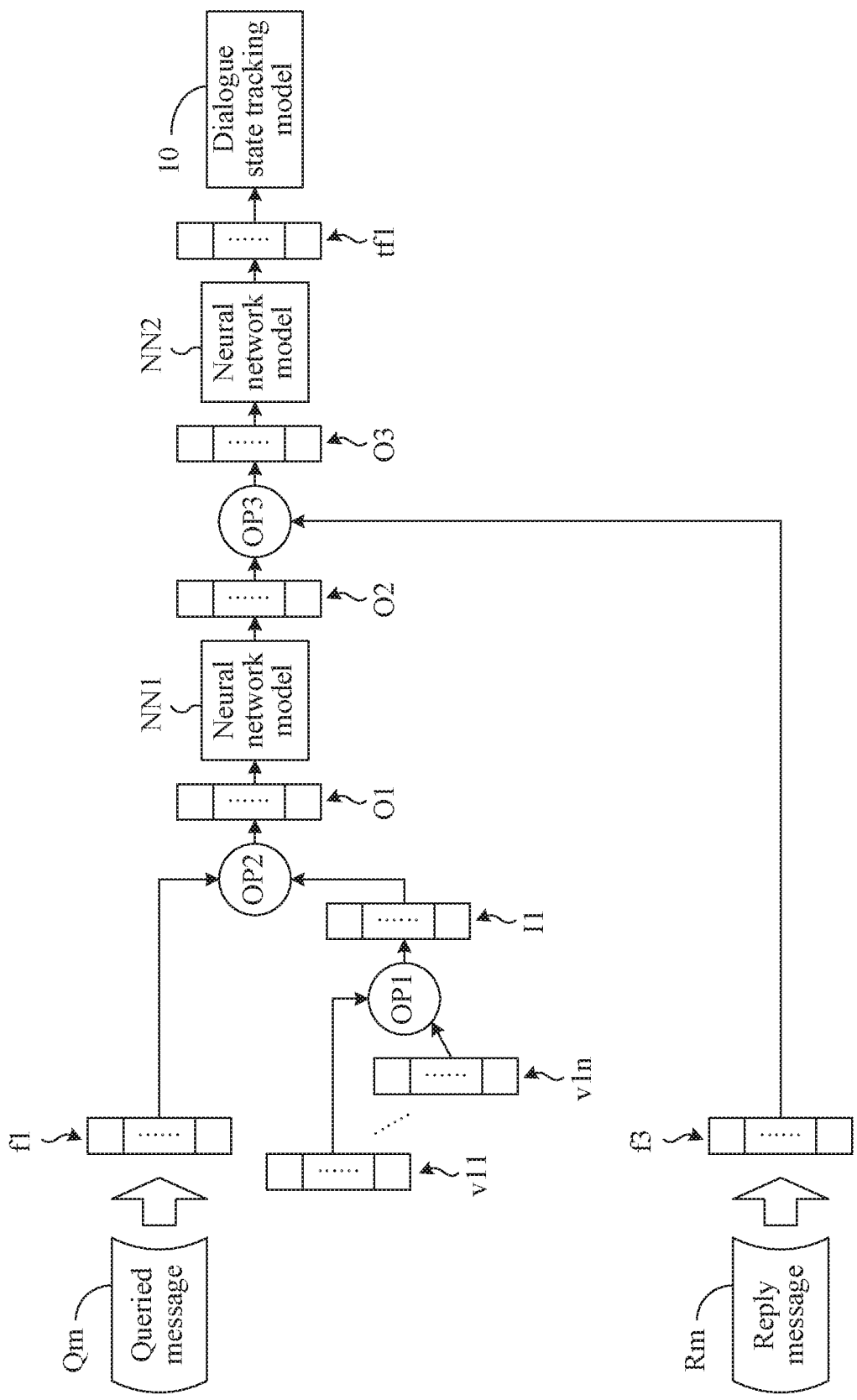
FIG. 1C is a schematic view of generating a queried field related feature tf1.

Please refer to FIG. 1C. The operations performed by the processor 13 for the case that the queried message Qm corresponds to a queried field will be firstly described. The processor 13 retrieves a field feature f1 corresponding to the queried field from the database 15 according to the queried field (e.g., birthday) corresponding to the queried message Qm. Specifically, the processor 13 finds out the word that is the same as the queried field from the database 15 and adopts the feature corresponding to the word as the field feature f1. In addition, the processor 13 retrieves a candidate-term feature for each of at least one candidate-term (not shown) corresponding to the queried field from the database 15. Specifically, the processor 13 finds out the word(s) corresponding to the queried field as the candidate-term(s) according to the correspondence relationships between the words stored in the database 15 and retrieves the feature of each candidate-term as the candidate-term feature(s). For convenience of subsequent explanation, it is assumed that the processor 13 obtains the candidate-term features $v11, \ldots, v1n$ after the aforementioned processing. Thereafter, the processor 13 integrates the candidate-term features $v11, \ldots, v1n$ into an integrated feature I1 by an operation OP1 (e.g., summation, concatenation, inner product, without being limited thereto). For example, the processor 13 may sum up the candidate-term features $v11, \ldots, v1n$ and take the result of the summation as the integrated feature I1.

In addition, the processor 13 analyzes the reply message Rm corresponding to the queried message Qm, finds out various relation sub-sentences of the reply message Rm, and generates a sentence relation feature f3 according to the relation sub-sentences of the reply message Rm. For example, the processor 13 may perform text segmentation on the reply message Rm and label their part of speech and then generate the relation sub-sentences of the reply message Rm according to technology disclosed Taiwan Patent No. 1666558. The processor 13 may individually input each relation sub-sentence into a neural network model (e.g., a Convolutional Neural Network (CNN), without being limited thereto) to generate a relation sub-sentence feature and then integrate (e.g., summation, concatenation, inner product, without being limited thereto) all the relation sub-sentence features into the sentence relation feature f3. It is noted that the above-mentioned technology for generating the relation sub-sentence of the reply message Rm is well-known to those of ordinary skill in the art, so the details will not be described herein.

Next, the processor 13 generates a queried field related feature tf1 according to the field feature f1, the integrated feature I1, and the sentence relation feature f3. In some embodiments, the processor 13 integrates the field feature f1 and the integrated feature I1 into an output feature O1 by an operation OP2. For example, the processor 13 may perform vector inner product on the field feature f1 and the integrated feature I1 to obtain the output feature O1. The purpose of performing vector inner product on the field feature f1 and the integrated feature I1 is to find out the similarity between the two features, which may also be understood as finding out the position in the queried field space where the field feature f1 is located. Next, the processor 13 inputs the output feature O1 into a neural network model NN1 to generate an output feature O2. Thereafter, the processor 13 integrates the output feature O2 and the sentence relation feature f3 by an operation OP3 (e.g., summation, concatenation, inner product, without being limited thereto) to generate an output feature O3. Thereafter, the processor 13 inputs the output feature O3 into a neural network model NN2 to generate the queried field related feature tf1. The aforesaid neural network models NN1 and NN2 may individually be a convolution neural network or a deep neural network (DNN), but it is not limited thereto.

Thereafter, the processor 13 trains the dialogue state tracking model 10 according to the queried field related feature tf1. It is noted that the dialogue state tracking model 10 may be a convolutional neural network, a deep neural network, or other neural networks.

Figure 1D:
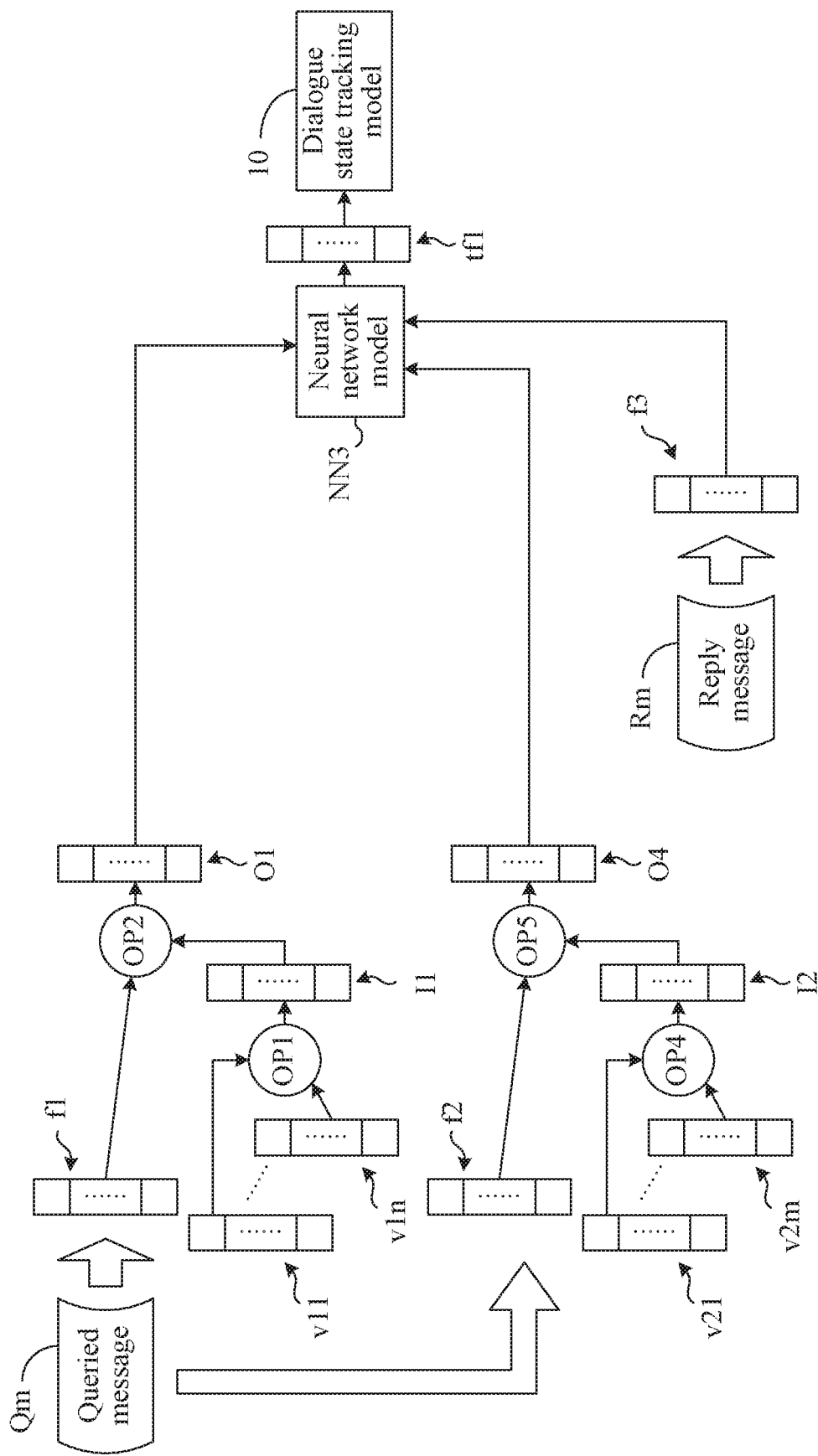
FIG. 1D is another schematic view of generating the queried field related feature tf1.

Please refer to FIG. 1D. Next, the operations performed by the processor 13 for the case that the queried message Qm corresponds to a queried field and a field reply are described. Similar to the case shown in FIG. 1C, the processor 13 will adopt the same operations to generate the field feature f1 and the integrated feature I1 according to the queried field corresponding to the queried message Qm, which will not be further described herein. The following description will focus on the differences between FIG. 1D and FIG. 1C.

The processor 13 further retrieves a reply feature f2 corresponding to a field reply from the database 15 according to the field reply corresponding to the queried message Qm. Specifically, the processor 13 finds out the word that is the same as the field reply from the database 15 and adopts the feature corresponding to the word as the reply feature f2. For example, if the content of the queried message Qm is "Is your birthday March 3?", the field reply corresponding to the queried message Qm may be "March 3" and the processor 13 accordingly retrieves the corresponding reply feature f2. In addition, the processor 13 retrieves a candidate-term feature for each of at least one candidate-term (not shown) corresponding to the field reply from the database 15. Specifically, the processor 13 finds out the word(s) corresponding to the word field reply (e.g., March 3) as the candidate-term(s) according to the correspondence relationship between the words stored in the database 15 and retrieves the feature of each candidate-term as the candidate-term feature(s). For convenience of subsequent explanation, it is assumed that the processor 13 obtains the candidate-term features $v21, \ldots, v2m$ after the above-mentioned processing. Thereafter, the processor 13 integrates the candidate-term features $v21, \ldots, v2m$ into an integrated feature I2 by an operation OP4 (e.g., summation, concatenation, inner product, without being limited thereto).

Thereafter, the processor 13 generates the queried field related feature tf1 according to the field feature f1, the reply feature f2, the integrated features I1, I2, and the sentence relation feature f3. In some embodiments, the processor 13 integrates the field feature f1 and the integrated feature I1 into the output feature O1 by the operation OP2, which has been described in detail before. In addition, the processor 13 integrates the reply feature f2 and the integrated feature I2 into an output feature O4 by an operation OP5. For example, the processor 13 may perform vector inner product on the reply feature f2 and the integrated feature I2 to obtain the output feature O4. The purpose of performing vector inner product on the reply feature f2 and the integrated feature I2 is to find out the similarity between the two features, which may also be understood as finding out the position in the field reply space where the reply feature f2 is located. Next, the processor 13 inputs the output feature O1, the output feature O4, and the sentence relation feature f3 into a neural network model NN3 to generate the queried field related feature tf1. The neural network models NN3 described above may be a convolution neural network or a deep neural network, but it is not limited thereto. Thereafter, the processor 13 trains the dialogue state tracking model 10 according to the queried field related feature tf1.

Figure 1E:
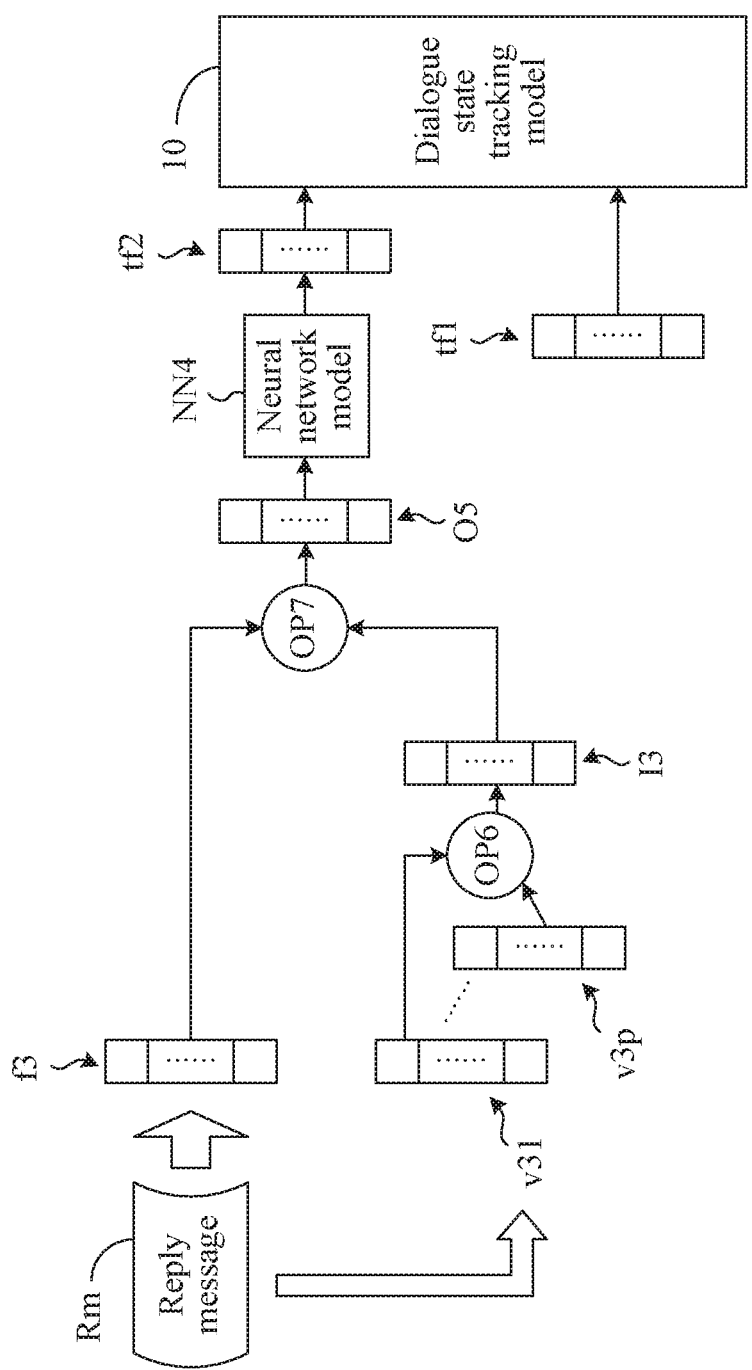
FIG. 1E is a schematic view of generating an advanced relation feature tf2.

Please refer to FIG. 1E. In some embodiments, the processor 13 of the model generation apparatus 1 further generates an advanced relation feature tf2 in addition to the queried field related feature tf1. For those embodiments, the processor 13 uses the queried field related feature tf1 and the advanced relation feature tf2 to train the dialogue state tracking model 10.

Specifically, for those embodiments, the storage 11 further stores a plurality of preset fields 12a, . . . , 12k. The contents of the preset fields 12a, . . . , 12k depend on to which task the dialogue record D currently processed by the model generation apparatus 1 is related. For example, if the dialogue record D is related to insurance claims, the preset fields 12a, . . . , 12k may comprise name, birthday, address, type of insurance, or the like.

For those embodiments, the processor 13 retrieves the candidate-term feature for each of at least one candidate-term (not shown) from the database 15 according to the reply message Rm and the preset fields 12a, . . . , 12k. Specifically, the processor 13 checks whether the reply message Rm has any relevant information corresponding to any of the preset fields 12a, . . . , 12k, finds out the word(s) corresponding to the relevant information as the candidate-term(s) according to the correspondence relationships between the words stored in the database 15, and retrieves the feature of each candidate-term as the candidate-term feature(s). For convenience of subsequent explanation, it is assumed that the processor 13 obtains candidate-term features v31, . . . , v3p after the above-mentioned processing. Thereafter, the processor 13 integrates the candidate-term features v31, . . . , v3p into an integrated feature 13 by an operation OP6 (e.g., summation, concatenation, inner product, without being limited thereto).

Next, the processor 13 generates the advanced relation feature tf2 according to the sentence relation feature f3 and the integrated feature 13. In some embodiments, the processor 13 integrates the sentence relation feature f3 and the integrated feature 13 into an output feature O5 by an operation OP7 (e.g., summation, concatenation, inner product, without being limited thereto), and inputs the output feature O5 into a neural network model NN4 to generate the advanced relation feature. The neural network model NN4 described above may be a convolution neural network or a depth neural network, but it is not limited thereto. Thereafter, the processor 13 trains the dialogue state tracking model 10 according to the queried field related feature tf1 and the advanced relation feature tf2.

Figure 1F:
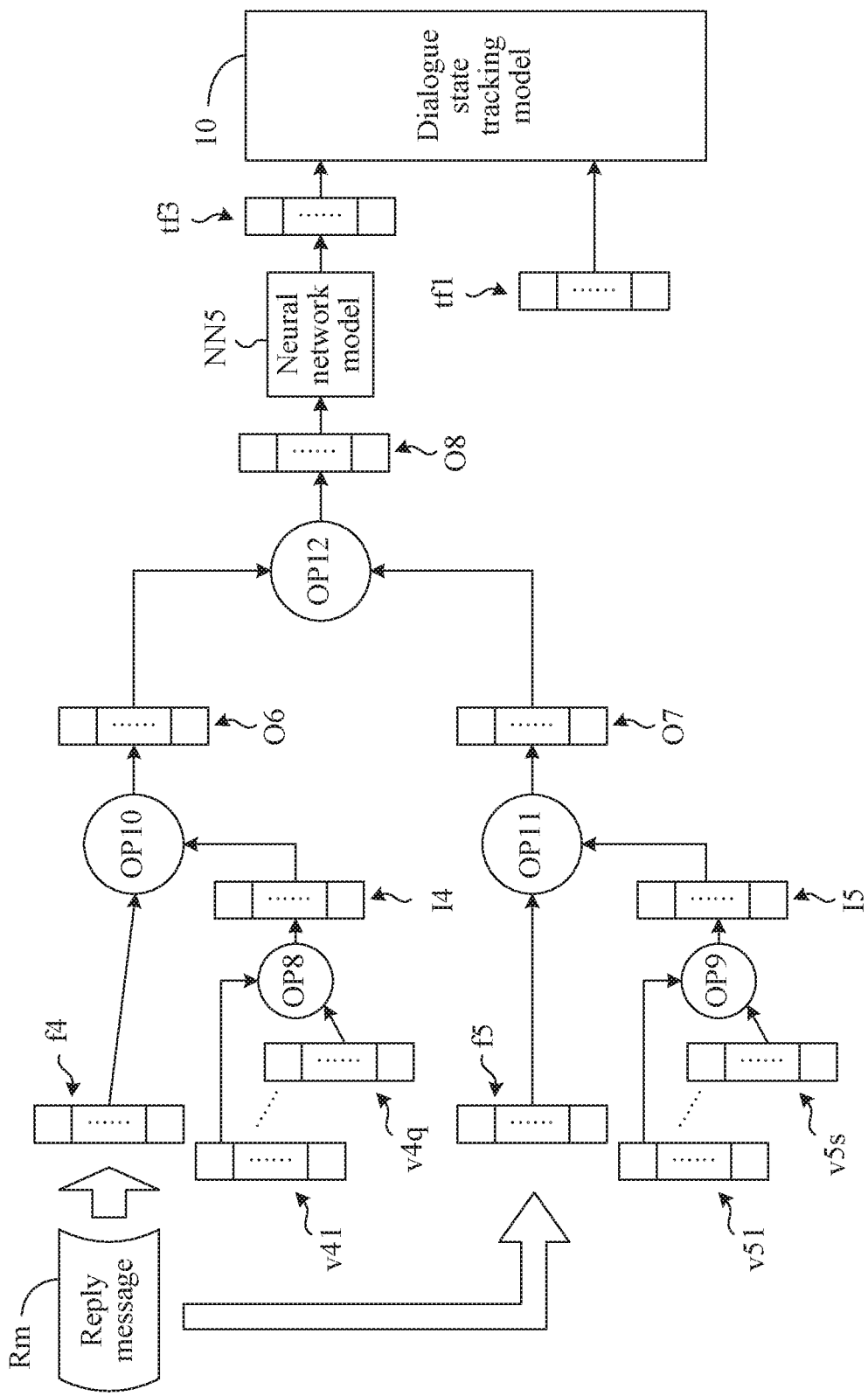
FIG. 1F is a schematic view of generating a semantic feature tf3.

Please refer to FIG. 1F. In some other embodiments, the processor 13 of the model generation apparatus 1 further generates a semantic feature tf3 in addition to the queried field related feature tf1. For those embodiments, the processor 13 uses the queried field related feature tf1 and the semantic feature tf3 to train the dialogue state tracking model 10.

Specifically, the processor 13 analyzes the reply message Rm by a Natural Language Understanding (NLU) algorithm to obtain a semantic field (not shown) and a semantic reply (not shown), whose purpose is to analyze the field message in the reply message Rm and the reply corresponding to the field message through NLU. It is noted that the operations regarding the NLU shall be well-known by those of ordinary skill in the art, so the details are not given herein.

The processor 13 retrieves a field feature f4 corresponding to the semantic field from the database 15. Specifically, the processor 13 finds out the word that is the same as the semantic field from the database 15 and uses the feature corresponding to the word as the field feature f4. In addition, the processor 13 retrieves a candidate-term feature for each of at least one candidate-term (not shown) corresponding to the semantic field from the database 15. Specifically, the processor 13 finds out the word(s) corresponding to the word semantic field as the candidate-term(s) according to the correspondence relationships between the words stored in the database 15 and retrieves the feature of each candidate-term as the candidate-term feature(s). For convenience of subsequent explanation, it is assumed that the processor 13 obtains candidate-term features v41, . . . , v4q after the aforementioned processing. Thereafter, the processor 13 integrates the candidate-term features v41, . . . , v4q into an integrated feature 14 by an operation OP8 (e.g., summation, concatenation, inner product, without being limited thereto).

Additionally, the processor 13 retrieves a reply feature f5 corresponding to the semantic reply from the database 15. Specifically, the processor 13 finds out the word that is the same as the semantic reply from the database 15 and uses the feature corresponding to the word as the reply feature f5. The processor 13 further retrieves a candidate-term feature for each of at least one candidate-term (not shown) corresponding to the semantic reply from the database 15. Specifically, the processor 13 finds out the word(s) corresponding to the word semantic reply as the candidate-term(s) according to the correspondence relationships between the words stored in the database 15 and retrieves the feature of each candidate-term as the candidate-term feature(s). For convenience of subsequent explanation, it is assumed that the processor 13 obtains the candidate-term features v51, . . . , v5s after the aforementioned processing. Thereafter, the processor 13 integrates the candidate-term features v51, . . . , v5s into an integrated feature 15 by an operation OP9 (e.g., summation, concatenation, inner product, without being limited thereto).

The processor 13 generates a semantic feature tf3 according to the field feature f4, the integrated feature 14, the reply feature f5, and the integrated feature IS. In some embodiments, the processor 13 integrates the field feature f4 and the integrated feature 14 into an output feature O6 by an operation OP10 (e.g., summation, concatenation, inner product, without being limited thereto), integrates the reply feature f5 and the integrated feature 15 into an output feature O7 by an operation OP11 (e.g., summation, concatenation, inner product, without being limited thereto), and integrates the output feature O6 and the output feature O7 into an output feature O8 by an operation OP12 (e.g., summation, concatenation, inner product, without being limited thereto). Thereafter, the processor 13 inputs the output feature O8 into a neural network model NN5 to generate the semantic feature tf3. The neural network model NN5 described above may be a convolution neural network or a depth neural network, but it is not limited thereto. Thereafter, the processor 13 trains the dialogue state tracking model 10 according to the queried field related feature tf1 and the semantic feature tf3.

In some embodiments, the model generation apparatus 1 may generate various features for training the dialogue state tracking model 10 by using all the aforementioned technologies and use these features together to train the dialogue state tracking model 10. In brief, in these embodiments, the processor 13 generates the queried field related feature tf1, the advanced relation feature tf2, and the semantic feature tf3 by the aforementioned technologies and trains the dialogue state tracking model 10 with the queried field related feature tf1, the advanced relation feature tf2, and the semantic feature tf3.

As mentioned above, the dialogue record D may comprise multiple rounds of dialogues, and each round of dialogue comprises a queried message and a reply message. Therefore, in some embodiments, the processor 13 may generate the queried field related feature tf1 and even the advanced relation feature tf2 and/or the semantic feature tf3 based on the queried message and the reply message of each round of dialogue and train the dialogue state tracking model 10 accordingly. The details will not be further described herein.

According to the above descriptions, the model generation apparatus 1 retrieves different features (including the field feature corresponding to the queried field itself and the candidate-term feature(s) corresponding to the candidate-term(s)) from the database according to the queried field corresponding to a queried message. The model generation apparatus 1 also finds out relation sub-sentences of a reply message and generates a sentence relation feature accordingly. Thereafter, the model generation apparatus 1 further generates a queried field related feature for training a dialogue state tracking model according to the feature retrieved from the database and the sentence relation feature and trains the dialogue state tracking model with the queried field related feature.

The model generation apparatus 1 may further find out other available relation information and semantic information from the reply message and generate the advanced relation feature and the semantic feature accordingly, and uses the queried field related feature along with the advanced relation feature and/or the semantic feature to train the dialogue state tracking model. Since the model generation apparatus 1 takes various aspects into consideration, including various features in the queried message and the reply message, various relation sub-substances and semantics in the reply message, and mutual influences among the features, the relation sub-sentences, and the semantics, the accuracy of dialogue state tracking is remarkably improved and thus the probability of accomplishing a dialogue task is increased.

Figure 2A:
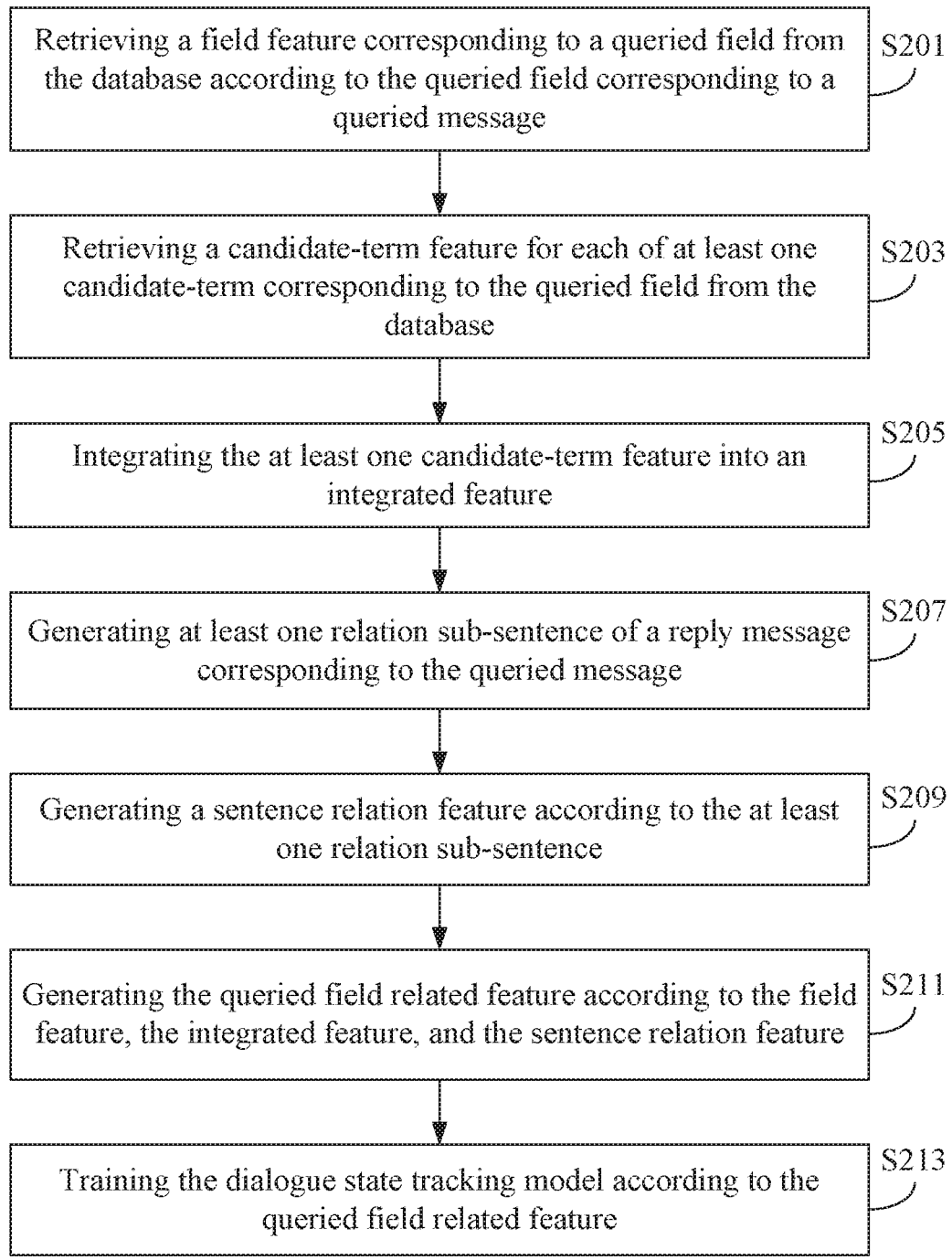
FIG. 2A is a flowchart depicting a model generation method of a second embodiment.

A second embodiment of the present invention is a method for generating a dialogue state tracking model (which is referred to as a "model generation method" hereinafter), and a main flowchart thereof is depicted in FIG. 2A. The model generation method is adapted for use in an electronic apparatus (e.g., the model generation apparatus 1 in the first embodiment). The electronic apparatus stores a database, wherein the database comprises a plurality of words commonly used in dialogues of a certain task, a feature of each word, and the correspondence relationships between the words. The electronic apparatus further stores a dialogue record regarding a conversation between a human-machine dialogue system and a user, and the dialogue record comprises at least one round of dialogue. Each round of dialogue comprises a queried message and a reply message, and the queried message and the reply message in the same round of dialogue correspond to each other.

The model generation method generates a queried field related feature for training the dialogue state tracking model according to a queried message and a reply message in a round of dialogue and uses the queried field related feature to train the dialogue state tracking model. Specifically, in step S201, the electronic apparatus retrieves a field feature corresponding to a queried field from the database according to the queried field (e.g., birthday) corresponding to the queried message. In step S203, the electronic apparatus retrieves a candidate-term feature for each of at least one candidate-term corresponding to the queried field from the database. It is noted that the order that the steps S201 and S203 are executed is not limited by the present invention. In other words, the step S203 may be executed earlier than the step S201, or the step S201 and the step S203 may be executed simultaneously. Thereafter, in step S205, the electronic apparatus integrates (e.g., through summation, concatenation, inner product, without being limited thereto) the at least one candidate-term feature into an integrated feature.

Additionally, in step S207, the electronic apparatus generates at least one relation sub-sentence of the reply message. Please noted that the order that the steps S201, S203, and S207 are executed is not limited by the present invention. In other words, the step S207 may be executed earlier than the step S201 and/or the step S203, or the step S207 may be executed simultaneously with the step S201 and/or the step S203. In step S209, the electronic apparatus generates a sentence relation feature according to the at least one relation sub-sentence. Next, in step S211, the electronic apparatus generates the queried field related feature according to the field feature, the integrated feature, and the sentence relation feature. Thereafter, in step S213, the electronic apparatus trains the dialogue state tracking model according to the queried field related feature.

In some embodiments, the step S211 may comprise: step (a) of integrating the field feature and the integrated feature (e.g., through summation, concatenation, inner product, without being limited thereto) into an output feature, step (b) of inputting the output feature generated in the step (a) into a neural network model to generate another output feature, step (c) of integrating the output feature generated in the step (b) and the sentence relation feature (e.g., through summation, concatenation, inner product, without being limited thereto) to generate an output feature, and step (d) of inputting the output feature generate in the step (c) into another neural network model to generate the queried field related feature.

In some embodiments, the queried message also corresponds to a field reply in addition to a queried field. The model generation method of these embodiments may perform the process flow shown in FIG. 2B. In these embodiments, the model generation method also performs the aforementioned steps S201 to S209. In addition, in step S231, the electronic apparatus retrieves a reply feature corresponding to a field reply from the database according to the field reply corresponding to the queried message. In step S233, the electronic apparatus retrieves a candidate-term feature for each of at least one candidate-term corresponding to the field reply from the database. It is noted that the order that the steps S201, S203, S207, S231, and S233 are executed is not limited in the present invention. Thereafter, in step S235, the electronic apparatus integrates (e.g., summation, concatenation, inner product, without being limited thereto) the at least one candidate-term feature retrieved in the step S233 into an integrated feature. In step S237, the electronic apparatus generates the queried field related feature according to the field feature, the reply feature, the integrated feature generated in the step S205, the integrated feature generated in the step S235, and the sentence relation feature. Thereafter, in step S213, the electronic apparatus trains the dialogue state tracking model according to the queried field related feature.

In some embodiments, the step S237 may comprise: step (a) of integrating (e.g., summation, concatenation, inner product, without being limited thereto) the field feature and the integrated feature generated in the step S205 into an output feature, step (b) of integrating (e.g., summation, concatenation, inner product, without being limited thereto) the reply feature and the integrated feature generated in the step S235 into another output feature, and step (c) of inputting the output feature generated in the step (a), the output feature generated in the step (b), and the sentence relation feature into a neural network model to generate the queried field related feature.

Figure 2B:
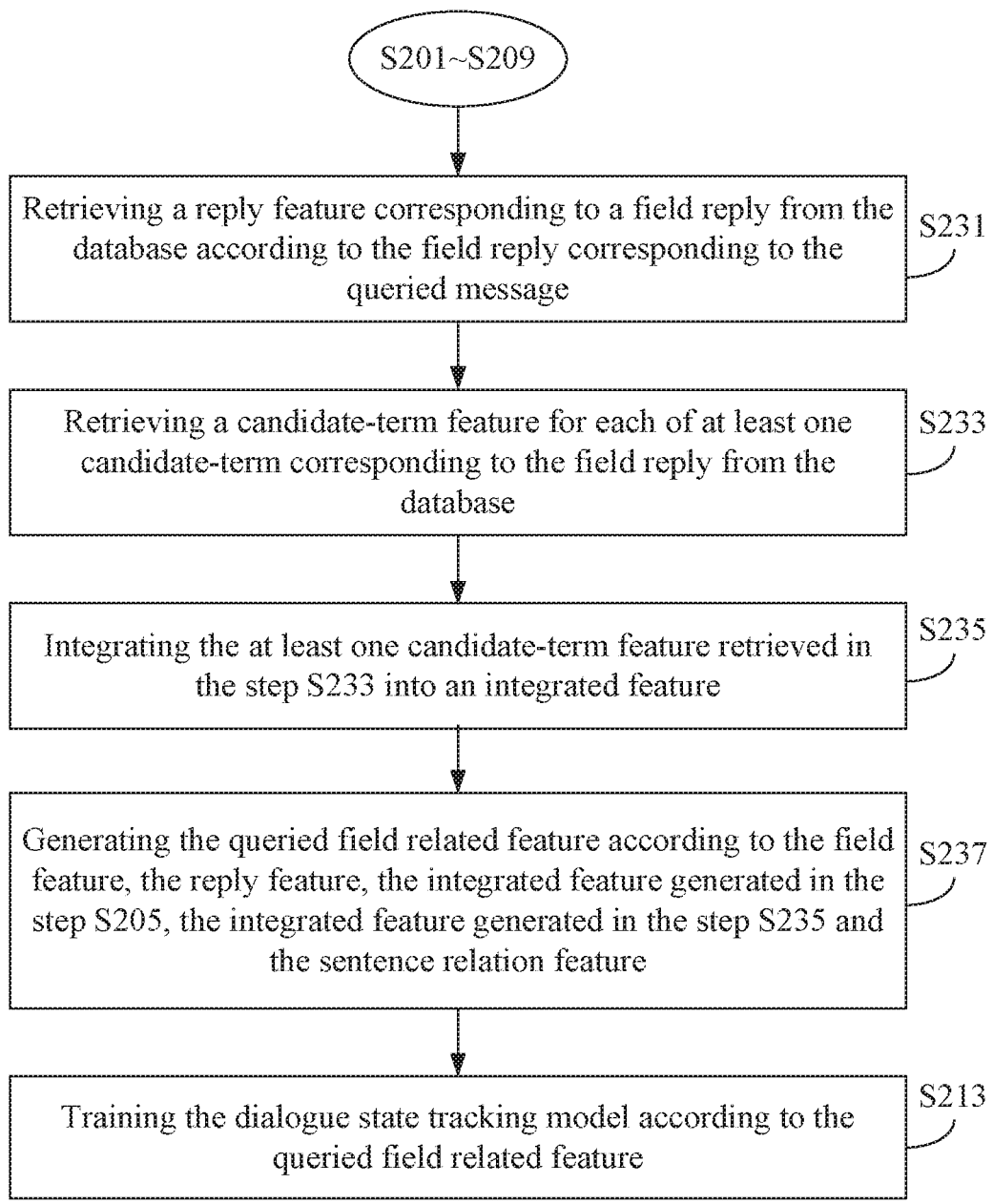
FIG. 2B is a flowchart depicting a model generation method of some embodiments.
Figure 2C:
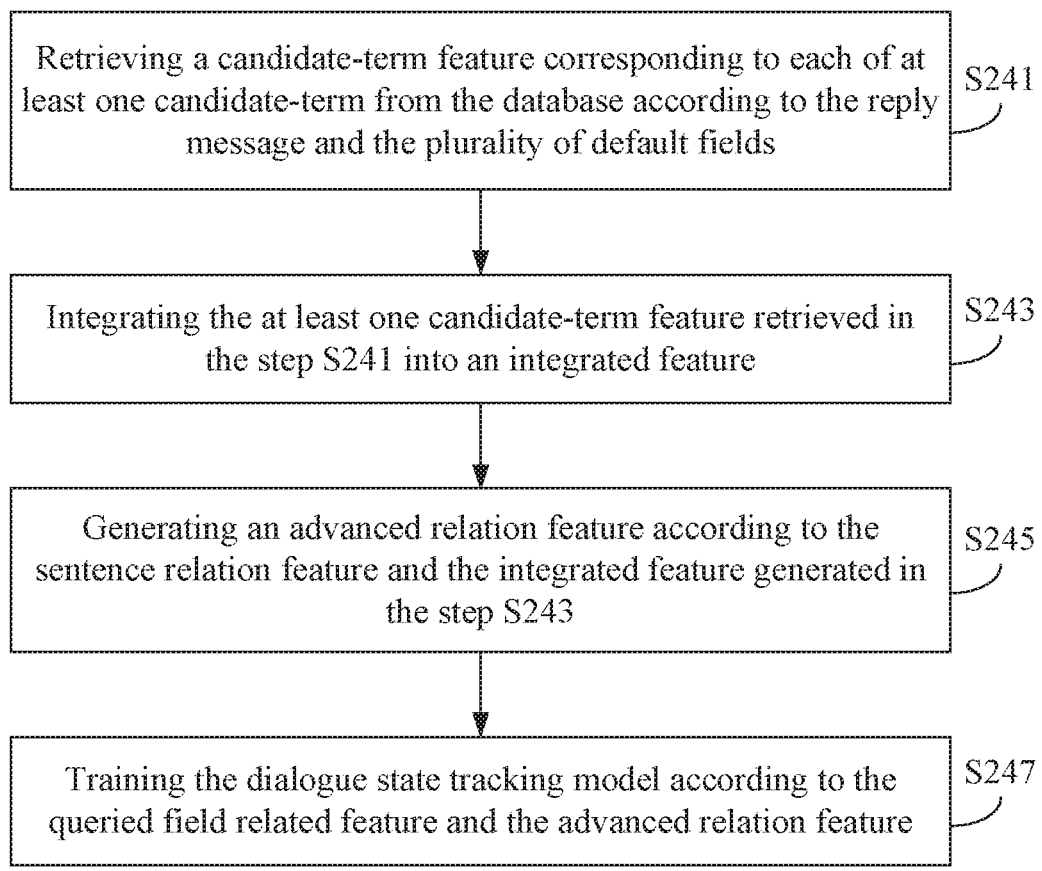
FIG. 2C is a flowchart depicting a part of a model generation method of some embodiments.

In some embodiments, in addition to generating the queried field related feature by using the process flow of FIG. 2A or the process flow of FIG. 2B, the model generation method also generates an advanced relation feature by using the process flow of FIG. 2C.

In some embodiments, the electronic apparatus further stores a plurality of preset fields. In step S241, the electronic apparatus retrieves a candidate-term feature for each of at least one candidate-term from the database according to the reply message and the plurality of default fields. For example, the step S241 may check whether the reply message has any relevant information corresponding to any of the preset fields, find out the word(s) corresponding to the relevant information as the candidate-term(s) according to the correspondence relationships between the words stored in the database, and retrieves the feature of each candidate-term as the candidate-term feature. In step S243, the electronic apparatus integrates the at least one candidate-term feature retrieved in the step S241 into an integrated feature. Next, in step S245, the electronic apparatus generates an advanced relation feature according to the sentence relation feature and the integrated feature generated in the step S243. Thereafter, in step S247, the electronic apparatus trains the dialogue state tracking model according to the queried field related feature and the advanced relation feature.

In some embodiments, the aforesaid step S245 may comprise: step (a) of integrating the sentence relation feature and the integrated feature generated in the step S243 into an output feature and step (b) of inputting the output feature generated in the step (a) into a neural network model to generate the advanced relation feature.

Figure 2D:
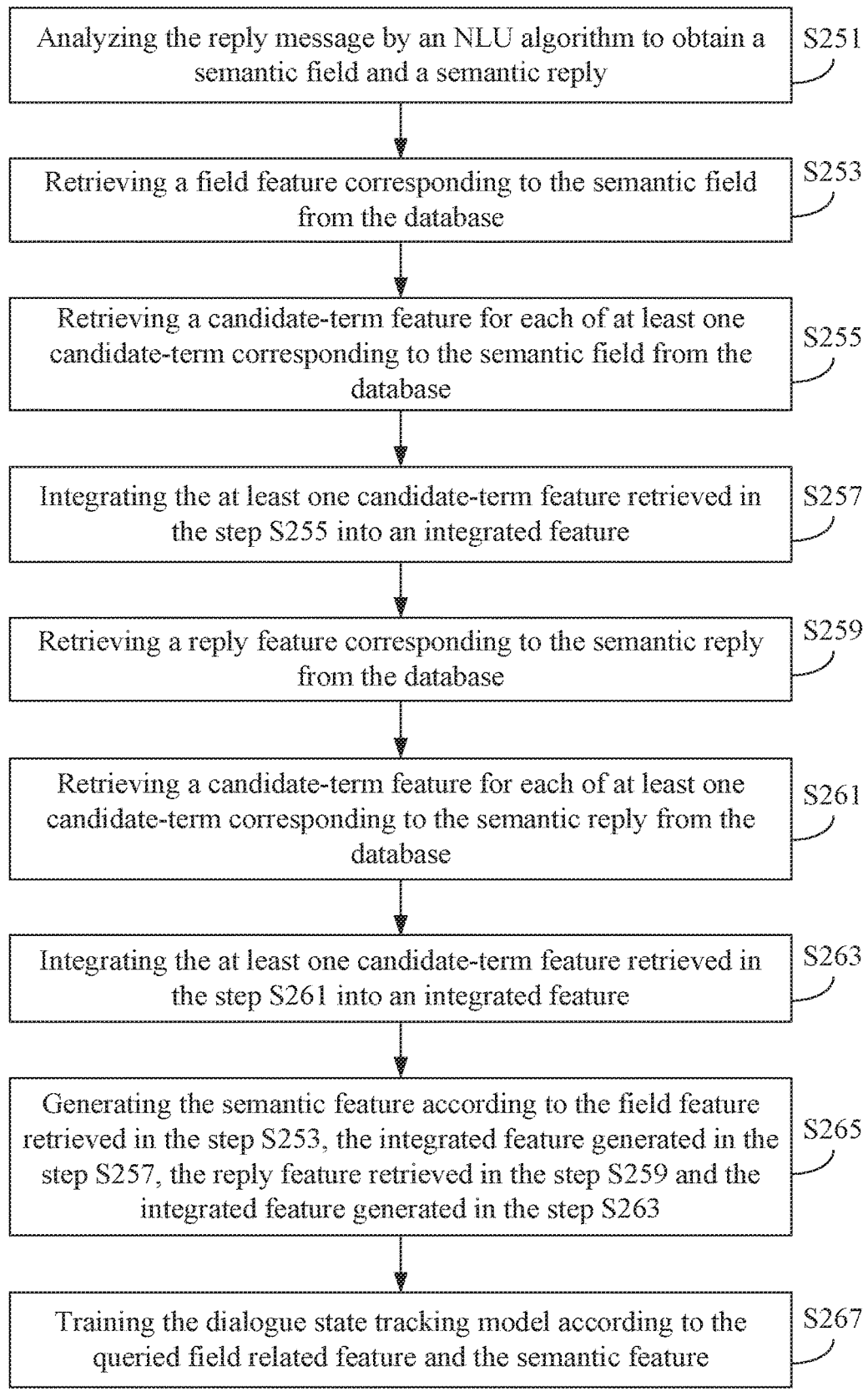
FIG. 2D is a flowchart depicting a part of a model generation method of some embodiments.

In some embodiments, in addition to generating the queried field related feature by using the process flow of FIG. 2A or the process flow of FIG. 2B, the model generation method also generates a semantic feature by using the process flow of FIG. 2D. Specifically, in step S251, the electronic apparatus analyzes the reply message by an NLU algorithm to obtain a semantic field and a semantic reply. In step S253, the electronic apparatus retrieves a field feature corresponding to the semantic field from the database. In step S255, the electronic apparatus retrieves a candidate-term feature for each of at least one candidate-term corresponding to the semantic field from the database. In step S257, the electronic apparatus integrates the at least one candidate-term feature retrieved in the step S255 into an integrated feature.

Next, in step S259, the electronic apparatus retrieves a reply feature corresponding to the semantic reply from the database. In step S261, the electronic apparatus retrieves a candidate-term feature for each of at least one candidate-term corresponding to the semantic reply from the database. It is noted that the order that the steps S253, S255, S259, and S261 are executed is not limited in the present invention. In step S263, the electronic apparatus integrates the at least one candidate-term feature retrieved in the step S261 into an integrated feature. In step S265, the electronic apparatus generates the semantic feature according to the field feature retrieved in the step S253, the integrated feature generated in the step S257, the reply feature retrieved in the step S259, and the integrated feature generated in the step S263. Thereafter, in step S267, the electronic apparatus trains the dialogue state tracking model according to the queried field related feature and the semantic feature.

In some embodiments, the aforesaid step S265 may comprise: step (a) of integrating (e.g., summation, concatenation, inner product, without being limited thereto) the field feature retrieved in the step S253 and the integrated feature generated in the step S257 into an output feature, step (b) of integrating (e.g., summation, concatenation, inner product, without being limited thereto) the reply feature retrieved in the step S259 and the integrated feature generated in the step S263 into another output feature, step (c) of integrating the output feature generated in the step (a) and the output feature generated in the step (b) into an output feature, and step (d) of inputting the output feature generated in the step (c) into a neural network model to generate the semantic feature.

In some embodiments, the model generation method may generate various features for training the dialogue state tracking model by using all the aforementioned process flows of FIG. 2A to FIG. 2D and use these features together to train the dialogue state tracking model. How to use all the aforesaid process flows based on the above embodiments shall be readily appreciated by those of ordinary skill in the art, so the details will not be described herein.

Furthermore, in some embodiments, a dialogue record may comprise multiple rounds of dialogues and each round of dialogue comprises a queried message and a reply message. For those embodiments, the model generation method may generate the queried field related feature and even the advanced relation feature and/or the semantic feature based on the queried message and the reply message of each round of dialogue. The details will not be further described herein.

In addition to the aforesaid steps, the second embodiment can also execute all the operations and steps of the model generation apparatus 1 set forth in the first embodiment, have the same functions, and deliver the same technical effects as the first embodiment. How the second embodiment executes these operations and steps, have the same functions, and deliver the same technical effects as the first embodiment will be readily appreciated by those of ordinary skill in the art based on the explanation of the first embodiment, so the details are not given herein.

Please note that in the claims of the present invention, some words (including field feature, candidate-term, candidate-term feature, integrated feature, output feature, reply feature, neural network model or the like) are preceded by ordinal numerals "first," "second," or "third" and these ordinal numerals are only used to indicate that these words are different items.

According to the above descriptions, the technology (at least including the apparatus and method) for generating a dialogue state tracking model provided by the present invention retrieves different features (including the field feature corresponding to the queried field itself and the candidate-term feature(s) corresponding to the candidate-term(s)) from the database according to the queried field corresponding to a queried message. In addition, the present invention finds out the relation sub-sentences of a reply message in the round of dialogue and generates a sentence relation feature accordingly. Next, the present invention generates a queried field related feature for training a dialogue state tracking model according to the feature retrieved from the database and the sentence relation feature and trains the dialogue state tracking model with the queried field related feature.

The present invention may also find out other available relation information and semantic information from the reply message, utilize the features related to relation information and semantic information to generate the advanced relation feature and the semantic feature, and train the dialogue state tracking model with the queried field related feature as well as the advanced relation feature and/or the semantic feature. Since the present invention takes various aspects into consideration, including various features related to the queried message and the reply message, and various relation sub-substances and semantics of the reply message, and mutual influences among the features, the relation sub-sentences, and the semantics, the dialogue state tracking model trained by the present invention can greatly improve the accuracy of dialogue state tracking and thereby increase the probability of accomplishing tasks.

The above disclosure is only utilized to enumerate some embodiments of the present invention and illustrated technical features thereof, which is not used to limit the scope of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for generating a dialogue state tracking model, comprising:
   a storage, being configured to store a database; and
   a processor, being electrically connected to the storage and configured to retrieve a first field feature corresponding to a queried field from the database according to the queried field corresponding to a queried message, retrieves a first candidate-term feature for each of at least one first candidate-term corresponding to the queried field from the database, and integrates the at least one first candidate-term feature into a first integrated feature,
   wherein the processor further generates at least one relation sub-sentence of a reply message corresponding to the queried message, generates a sentence relation feature according to the at least one relation sub-sentence, generates a queried field related feature according to the first field feature, the first integrated feature, and the sentence relation feature, and trains the dialogue state tracking model according to the queried field related feature.

2. The apparatus of claim 1, wherein the processor further integrates the first field feature and the first integrated feature into a first output feature, inputs the first output feature into a first neural network model to generate a second output feature, integrates the second output feature and the sentence relation feature into a third output feature, and inputs the third output feature into a second neural network model to generate the queried field related feature.

3. The apparatus of claim 1, wherein the processor further retrieves a first reply feature corresponding to a field reply from the database according to the field reply corresponding to the queried message, retrieves a second candidate-term feature for each of at least one second candidate-term corresponding to the field reply from the database, and integrates the at least one second candidate-term feature into a second integrated feature, wherein the queried field related feature is generated by the processor according to the first field feature, the first reply feature, the first integrated feature, the second integrated feature, and the sentence relation feature.

4. The apparatus of claim 3, wherein the processor further retrieves a third candidate-term feature for each of at least one third candidate-term from the database according to the reply message and a plurality of default fields, integrates the at least one third candidate-term feature into a third integrated feature, and generates an advanced relation feature according to the sentence relation feature and the third integrated feature,
   wherein the processor further analyzes the reply message by an NLU algorithm to generate a semantic field and a semantic reply, retrieves a second field feature corresponding to the semantic field from the database, retrieves a fourth candidate-term feature for each of at least one fourth candidate-term corresponding to the semantic field from the database, and integrates the at least one fourth candidate-term feature into a fourth integrated feature,
   wherein the processor further retrieves a second reply feature corresponding to the semantic reply from the database, retrieves a fifth candidate-term feature for each of at least one fifth candidate-term corresponding to the semantic reply from the database, integrates the at least one fifth candidate-term feature into a fifth integrated feature, and generates a semantic feature according to the second field feature, the fourth integrated feature, the second reply feature, and the fifth integrated feature,
   wherein the dialogue state tracking model is trained by the processor according to the queried field related feature, the advanced relation feature, and the semantic feature.

5. The apparatus of claim 3, wherein the processor further integrates the first field feature and the first integrated feature into a first output feature, integrates the first reply feature and the second integrated feature into a second output feature, and inputs the first output feature, the second output feature, and the sentence relation feature into a neural network model to generate the queried field related feature.

6. The apparatus of claim 1, wherein the processor further retrieves a second candidate-term feature for each of at least one second candidate-term from the database according to the reply message and a plurality of default fields, integrates the at least one second candidate-term feature into a second integrated feature, and generates an advanced relation feature according to the sentence relation feature and the second integrated feature, wherein the dialogue state tracking model is trained by the processor according to the queried field related feature and the advanced relation feature.

7. The apparatus of claim 6, wherein the processor further integrates the sentence relation feature and the second integrated feature into an output feature and inputs the output feature into a neural network model to generate the advanced relation feature.

8. The apparatus of claim 1, wherein the processor further analyzes the reply message by a Natural Language Understanding (NLU) algorithm to generate a semantic field and a semantic reply, retrieves a second field feature corresponding to the semantic field from the database, retrieves a second candidate-term feature for each of at least one second candidate-term corresponding to the semantic field from the database, and integrates the at least one second candidate-term feature into a second integrated feature,
   wherein the processor further retrieves a reply feature corresponding to the semantic reply from the database, retrieves a third candidate-term feature for each of at least one third candidate-term corresponding to the semantic reply from the database, and integrates the at least one third candidate-term feature into a third integrated feature, wherein the processor further generates a semantic feature according to the second field feature, the second integrated feature, the reply feature, and the third integrated feature, wherein the dialogue state tracking model is trained by the processor according to the queried field related feature and the semantic feature.

9. The apparatus of claim 8, wherein the processor further integrates the second field feature and the second integrated feature into a first output feature, integrates the reply feature and the third integrated feature into a second output feature, integrates the first output feature and the second output feature into a third output feature, and inputs the third output feature into a neural network model to generate the semantic feature.

10. The apparatus of claim 1, wherein the processor further retrieves a second candidate-term feature for each of at least one second candidate-term from the database according to the reply message and a plurality of default fields, integrates the at least one second candidate-term feature into a second integrated feature, and generates an advanced relation feature according to the sentence relation feature and the second integrated feature, wherein the processor further analyzes the reply message by an NLU algorithm to generate a semantic field and a semantic reply, retrieves a second field feature corresponding to the semantic field from the database, retrieves a third candidate-term feature for each of at least one third candidate-term corresponding to the semantic field from the database, and integrates the at least one third candidate-term feature into a third integrated feature, wherein the processor further retrieves a reply feature corresponding to the semantic reply from the database, retrieves a fourth candidate-term feature for each of at least one fourth candidate-term corresponding to the semantic reply from the database, integrates the at least one fourth candidate-term feature into a fourth integrated feature, and generates a semantic feature according to the second field feature, the third integrated feature, the reply feature, and the fourth integrated feature, wherein the dialogue state tracking model is trained by the processor according to the queried field related feature, the advanced relation feature, and the semantic feature.

11. A method for generating a dialogue state tracking model, being executed by an electronic apparatus, the electronic apparatus storing a database, the method comprising:
(a) retrieving a first field feature corresponding to a queried field from the database according to the queried field corresponding to a queried message;
(b) retrieving a first candidate-term feature for each of at least one first candidate-term corresponding to the queried field from the database;
(c) integrating the at least one first candidate-term feature into a first integrated feature;
(d) generating at least one relation sub-sentence of a reply message corresponding to the queried message;
(e) generating a sentence relation feature according to the at least one relation sub-sentence;
(f) generating a queried field related feature according to the first field feature, the first integrated feature, and the sentence relation feature; and
(g) training the dialogue state tracking model according to the queried field related feature.

12. The method of claim 11, wherein the step (f) comprises:
integrating the first field feature and the first integrated feature into a first output feature;
inputting the first output feature into a first neural network model to generate a second output feature;
integrating the second output feature and the sentence relation feature into a third output feature; and
inputting the third output feature into a second neural network model to generate the queried field related feature.

13. The method of claim 11, further comprising:
retrieving a first reply feature corresponding to a field reply from the database according to the field reply corresponding to the queried message;
retrieving a second candidate-term feature for each of at least one second candidate-term corresponding to the field reply from the database; and
integrating the at least one second candidate-term feature into a second integrated feature,
wherein the step (f) generates the queried field related feature according to the first field feature, the first reply feature, the first integrated feature, the second integrated feature, and the sentence relation feature.

14. The method of claim 13, further comprising:
retrieving a third candidate-term feature for each of at least one third candidate-term from the database according to the reply message and a plurality of default fields;
integrating the at least one third candidate-term feature into a third integrated feature;
generating an advanced relation feature according to the sentence relation feature and the third integrated feature;
analyzing the reply message by an NLU algorithm to generate a semantic field and a semantic reply;
retrieving a second field feature corresponding to the semantic field from the database;
retrieving a fourth candidate-term feature for each of at least one fourth candidate-term corresponding to the semantic field from the database;
integrating the at least one fourth candidate-term feature into a fourth integrated feature;
retrieving a second reply feature corresponding to the semantic reply from the database;
retrieving a fifth candidate-term feature for each of at least one fifth candidate-term corresponding to the semantic reply from the database;
integrating the at least one fifth candidate-term feature into a fifth integrated feature; and
generating a semantic feature according to the second field feature, the fourth integrated feature, the second reply feature, and the fifth integrated feature,
wherein the step (g) trains the dialogue state tracking model according to the queried field related feature, the advanced relation feature, and the semantic feature.

15. The method of claim 13, wherein the step (f) comprises:
integrating the first field feature and the first integrated feature into a first output feature;
integrating the first reply feature and the second integrated feature into a second output feature; and inputting the first output feature, the second output feature, and the sentence relation feature into a neural network model to generate the queried field related feature.

16. The method of claim 11, further comprising:
retrieving a second candidate-term feature for each of at least one second candidate-term from the database according to the reply message and a plurality of default fields;
integrating the at least one second candidate-term feature into a second integrated feature; and
generating an advanced relation feature according to the sentence relation feature and second integrated feature,
wherein the step (g) trains the dialogue state tracking model according to the queried field related feature and the advanced relation feature.

17. The method of claim 16, wherein the step of generating the advanced relation feature comprises:
integrating the sentence relation feature and the second integrated feature into an output feature; and
inputting the output feature into a neural network model to generate the advanced relation feature.

18. The method of claim 11, further comprising:
analyzing the reply message by an NLU algorithm to generate a semantic field and a semantic reply;
retrieving a second field feature corresponding to the semantic field from the database;
retrieving a second candidate-term feature for each of at least one second candidate-term corresponding to the semantic field from the database;
integrating the at least one second candidate-term feature into a second integrated feature;
retrieving a reply feature corresponding to the semantic reply from the database;
retrieving a third candidate-term feature for each of at least one third candidate-term corresponding to the semantic reply from the database;
integrating the at least one third candidate-term feature into a third integrated feature; and
generating a semantic feature according to the second field feature, the second integrated feature, the reply feature, and the third integrated feature,
wherein the step (g) trains the dialogue state tracking model according to the queried field related feature and the semantic feature.

19. The method of claim 18, wherein the step of generating the semantic feature comprises:
integrating the second field feature and the second integrated feature into a first output feature;
integrating the reply feature and the third integrated feature into a second output feature;
integrating the first output feature and the second output feature into a third output feature; and
inputting the third output feature into a neural network model to generate the semantic feature.

20. The method of claim 11, further comprising:
retrieving a second candidate-term feature for each of at least one second candidate-term from the database according to the reply message and a plurality of default fields;
integrating the at least one second candidate-term feature into a second integrated feature;
generating an advanced relation feature according to the sentence relation feature and the second integrated feature;
analyzing the reply message by an NLU algorithm to generate a semantic field and a semantic reply;
retrieving a second field feature corresponding to the semantic field from the database;
retrieving a third candidate-term feature for each of at least one third candidate-term corresponding to the semantic field from the database;
integrating the at least one third candidate-term feature into a third integrated feature;
retrieving a reply feature corresponding to the semantic reply from the database;
retrieving a fourth candidate-term feature for each of at least one fourth candidate-term corresponding to the semantic reply from the database;
integrating the at least one fourth candidate-term feature into a fourth integrated feature; and
generating a semantic feature according to the second field feature, the third integrated feature, the reply feature, and the fourth integrated feature,
wherein the step (g) trains the dialogue state tracking model according to the queried field related feature, the advanced relation feature, and the semantic feature.

* * * * *